Patented Dec. 3, 1935

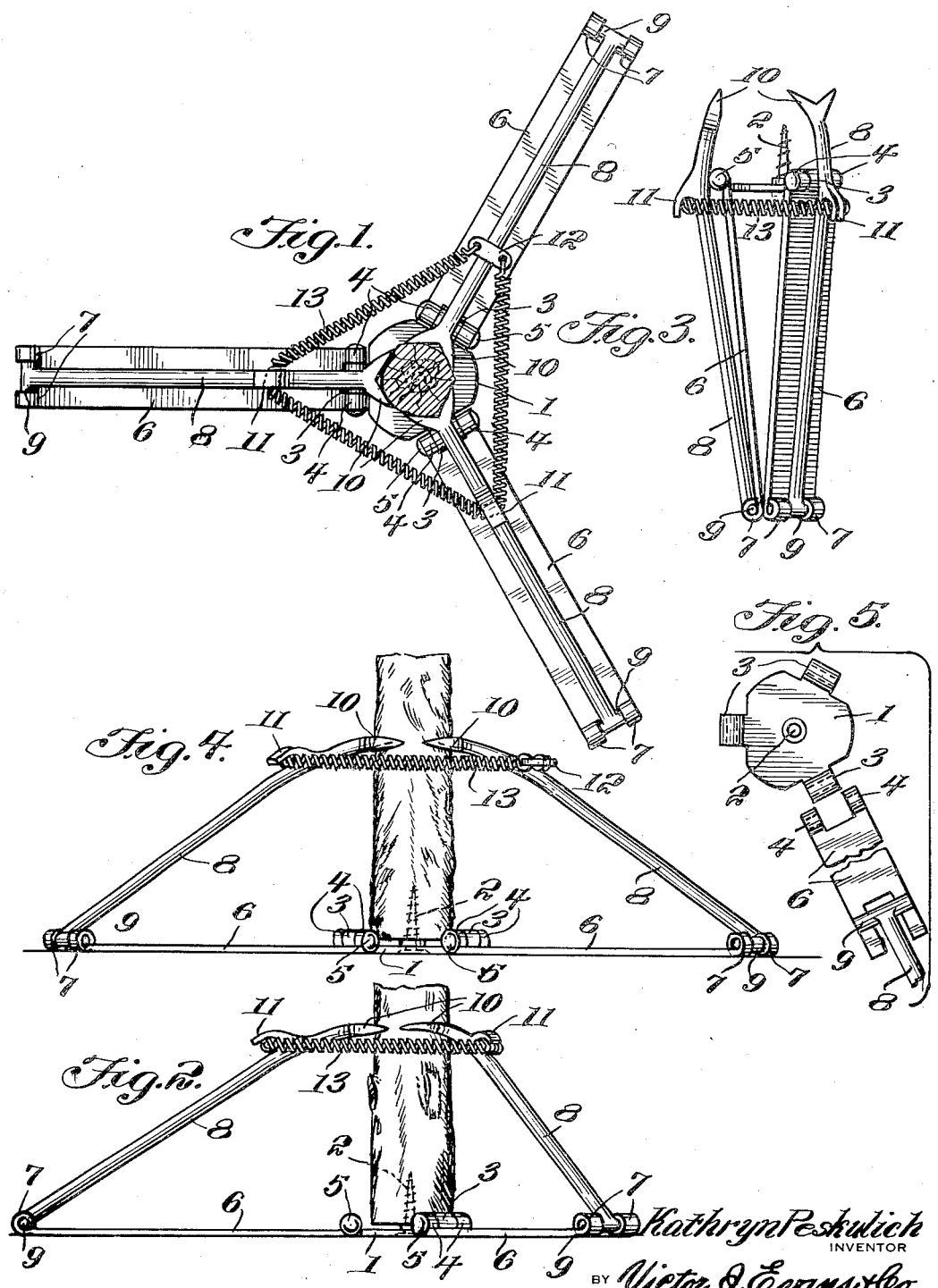

2,023,340

UNITED STATES PATENT OFFICE 2,023,340

TREE HOLDER

Kathryn Peskulich, Black Eagle, Mont.

Application July 13, 1934, Serial No. 735,061

5 Claims. (Cl. 248—44)

This invention relates to tree holders and its general object is to provide a holder that is primarily designed for use in holding or supporting a Christmas tree and which can be easily and expeditiously applied thereto, as well as will firmly support the same vertically or at an angle without fear of displacement or falling.

A further object of the invention is to provide a tree holder that is foldable into a compact form so that it can be stored into a small space.

Another object of the invention is to provide a tree holder that is capable of being easily adjusted with respect to the tree after being applied thereto.

A still further object of the invention is to provide a tree holder that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a top plan view of the holder which forms the subject matter of the present invention and illustrates the same applied to a trunk of a tree.

Figure 2 is a side elevation of the device applied to the trunk of the tree.

Figure 3 is a view showing the holder folded.

Figure 4 is a view taken at an angle with respect to Figure 2.

Figure 5 is a detail view illustrating parts of my holder.

Referring to the drawing in detail, the reference numeral 1 indicates the base of my holder which as shown is in the form of a plate having secured centrally thereof and rising therefrom a screw 2 which is swiveled thereto, so that it can be rotated to secure the same within the trunk of a tree as will be apparent.

The base has formed thereon at intervals about its edge, hinge barrels 3 which cooperate with hinge barrels 4 and pins 5 for pivotally securing base strips 6 to the base and in a manner whereby the strips radiate from the base, as best shown in Figure 1.

The outer ends of the base strips 6 are rolled upon themselves to provide barrels 7 which are recessed between their ends and the barrels 7 pivotally receive one of the ends of supporting arms 8, the latter having cross pins 9 formed thereon to be received in the barrels 7, so that the arms are movable in the recesses of the barrels 7 as will be apparent upon inspection of Figure 3.

The free ends of the arms are forked as at 10 and the tines of the forks are not only outwardly flared with respect to each other, but have sharpened inner edges and terminate in penetrating points for the purpose of gripping and penetrating the trunk of the tree, as best shown in Figure 1, to keep the tree centered and to prevent twisting.

The free end portions of the supporting arms 8 are curved downwardly for a slight degree, in order that the forks will be capable of obtaining a more direct bearing with respect to the trunk, as suggested in Figures 2 and 4, and arranged at the juncture of the downturned portions of the arms with the major portions thereof, I provide spring receiving means which include hooks 11 formed with two of the arms while the remaining arm as shown has secured thereto an apertured plate 12.

The spring which is indicated by the reference numeral 13 has one of its end convolutions permanently fixed in one of the apertures of the plate 12, while its opposite end convolution is adapted to be detachably secured into the other aperture thereof, and the spring is received in the hooks 11 as clearly shown in Figures 2 and 4, to hold the forks into gripping or penetrating contact with the trunk.

From the above description and disclosure of the drawing, it will be obvious that I have provided a tree holder that can be easily and expeditiously applied to the trunk of a tree for holding the latter in an upright position without fear of displacement or tilting, and in the event it is desired to arrange the tree at an angle, it can be disposed accordingly and the arms adjusted on the trunk, without removing the tree from the holder. Generally the adjustment of a single arm will accomplish the purpose. When the holder is removed from the trunk, it can be readily folded to the position as shown in Figure 3 and held accordingly by the spring and when so folded it is in a compact form and therefore can be stored in a small space.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A foldable tree holder comprising a base, tree trunk penetrating means rising from the base, strips pivotally secured to the base and adapted to radiate therefrom in a horizontal plane for cooperation therewith in supporting a tree, supporting arms having one of their ends pivotally secured to the outer ends of the strips, forks formed on the free ends of the arms and including sharpened tines terminating into penetrating points, and spring means received by said arms for holding the forks in operative position with respect to a trunk of a tree or for securing the holder in folded position.

2. A foldable tree holder comprising a base, means pivotally secured to said base and adapted to radiate therefrom in a horizontal plane for cooperation therewith in supporting a tree, arms having one of their ends pivotally secured to the outer ends of the radiating means, forks formed with the opposite ends of the arms and being sharpened and terminating in penetrating points, hook means secured to some of said arms, an apertured strip secured to one of said arms, a coil spring having one end fixed in one of the apertures of the strip and its opposite end adapted to be detachably received in the other aperture, and said spring adapted to be received by the hook means to hold the forks in operative position with respect to the trunk of a tree or for securing the holder in folded position.

3. A foldable tree holder comprising a base, means pivotally secured to said base for disposal in a horizontal plane for cooperation with said base in supporting a tree, arms having one of their ends pivotally secured to said means, tree receiving penetrating means at the free ends of said arms, and means for disposal about said arms for holding the penetrating means in operative position with respect to a tree or for securing the holder in folded position.

4. A foldable tree holder comprising a base, means pivotally secured to said base for disposal in a horizontal plane for cooperation with said base in supporting a tree, arms having one of their ends pivotally secured to said means for movement in a vertical plane, penetrating means formed with the free ends of said arms and spring means carried by the arms for holding the penetrating means in operative position with respect to a tree or for securing the holder in folded position.

5. A foldable tree holder comprising a base, tree trunk penetrating means secured to and rising from said base, means pivotally secured to said base and adapted to radiate therefrom in a horizontal plane for cooperation therewith in supporting a tree, arms having one of their ends pivotally secured to the outer ends of said means for movement in a vertical plane, forks formed on the free ends of said arms and providing tree receiving penetrating means, and spring means carried by the arms for disposal about the same to hold the last mentioned penetrating means in operative position with respect to a tree or for securing the holder in folded position.

KATHRYN PESKULICH.